United States Patent
Yogev (10) Patent No.: US 10,836,579 B2
(45) Date of Patent: Nov. 17, 2020

(54) SYSTEM FOR STORING COMPRESSED GAS AND METHOD FOR CONSTRUCTION THEREOF

(71) Applicant: Or Yogev, Gedera (IL)

(72) Inventor: Or Yogev, Gedera (IL)

(73) Assignee: AUGWIND, LTD., Nes Ziona (IL)

( * ) Notice: Subject to any disclaimer, the term of this patent is extended or adjusted under 35 U.S.C. 154(b) by 0 days.

(21) Appl. No.: 16/349,692

(22) PCT Filed: Oct. 29, 2017

(86) PCT No.: PCT/IL2017/051175
§ 371 (c)(1),
(2) Date: May 14, 2019

(87) PCT Pub. No.: WO2018/092122
PCT Pub. Date: May 24, 2018

(65) Prior Publication Data
US 2020/0071078 A1   Mar. 5, 2020

(30) Foreign Application Priority Data
Nov. 16, 2016 (IL) .......................................... 249007

(51) Int. Cl.
*B65G 5/00* (2006.01)
*E02D 29/045* (2006.01)
(Continued)

(52) U.S. Cl.
CPC ............. *B65G 5/00* (2013.01); *E02D 29/045* (2013.01); *F17C 1/007* (2013.01); *F17C 5/00* (2013.01);
(Continued)

(58) Field of Classification Search
CPC ...... F17C 1/007; F17C 5/00; F17C 2201/018; F17C 2203/0617; F17C 2203/066;
(Continued)

(56) References Cited

U.S. PATENT DOCUMENTS 3,003,322 A * 10/1961 Jordan ..................... B65G 5/00
   405/59
3,106,824 A * 10/1963 Gregory .................. F17C 3/005
   405/55
(Continued)

FOREIGN PATENT DOCUMENTS

EP   2832666 A1   4/2015
EP   2 982 861 A1   10/2016
(Continued)

*Primary Examiner* — Carib A Oquendo
(74) *Attorney, Agent, or Firm* — Browdy and Neimark, P.L.L.C.

(57) ABSTRACT

A gas storage system for storing compressed gas, and method for constructing the system, are described. The system includes a borehole having a first borehole portion and a second borehole portion. An inflatable balloon is arranged within the second borehole portion. An upper support member, mounted on top of the inflatable balloon, is configured for anchoring the inflatable balloon to a sealing material filling the first borehole portion. A lower support member is arranged at the bottom of the inflatable balloon. The system includes an inlet gas pipe for filling the inflatable balloon from the gas compressing system and an outlet gas pipe for releasing the compressed gas. A compacted filling material is placed within a gap formed between the inflatable balloon, the upper support member, the lower support member, and an inner surface of the second borehole portion. One or more filling material pipes extend along the borehole to the gap for providing a filling material thereto.

17 Claims, 5 Drawing Sheets

(51) Int. Cl.
*F17C 1/00* (2006.01)
*F17C 5/00* (2006.01)

(52) U.S. Cl.
CPC .. *F17C 2201/018* (2013.01); *F17C 2203/066* (2013.01); *F17C 2203/0617* (2013.01); *F17C 2203/0685* (2013.01); *F17C 2221/031* (2013.01); *F17C 2223/0123* (2013.01); *F17C 2270/0147* (2013.01); *F17C 2270/0581* (2013.01)

(58) Field of Classification Search
CPC ........ F17C 2203/0685; F17C 2221/031; F17C 2270/0581; F17C 2223/0123; F17C 2270/0147

See application file for complete search history.

(56) References Cited

U.S. PATENT DOCUMENTS

| | | | |
|---|---|---|---|
| 4,462,714 A * | 7/1984 | Smith | E21B 33/134 166/287 |
| 5,052,856 A | 10/1991 | Tek | |
| 5,207,530 A * | 5/1993 | Brooks | F17C 1/007 405/53 |
| 2010/0307147 A1 | 12/2010 | Ivy et al. | |
| 2011/0305515 A1* | 12/2011 | Drnevich | B65G 5/00 405/53 |
| 2013/0119327 A1 | 5/2013 | Kim et al. | |
| 2015/0184679 A1 | 7/2015 | Ivy et al. | |
| 2015/0321848 A1* | 11/2015 | Strybos | B65G 5/00 405/59 |

FOREIGN PATENT DOCUMENTS

| | | |
|---|---|---|
| GB | 2 457 400 A | 8/2009 |
| JP | S63-115997 A | 5/1988 |
| RU | 2 431 771 C1 | 10/2011 |

* cited by examiner

SYSTEM FOR STORING COMPRESSED GAS AND METHOD FOR CONSTRUCTION THEREOF

FIELD OF THE INVENTION

This invention relates generally to a system for storing and utilization of compressed fluid, and more specifically to a system in which the compressed gas is stored underground and later utilized as energy.

BACKGROUND OF THE INVENTION

It is known that compressed gas can be stored and utilized for many purposes. For example, stored compressed gas can be utilized in the glass and plastic container industry. However, consumption of compressed air in a glass and plastic container production plant is erratic, due to the nature of operation of plastic injection machines using compressed air. Each injection machine requires a short burst of high pressure air every few seconds (one burst per injection). When several of such machines are arranged in a production line, the air consumption profile is unsteady and erratic. A typical plant includes a compression train in which motor-driven compressors compress a certain gas, such as air. Due to the unsteady and erratic consumption profile of compressed air, operation of compressors in order to supply high pressure air results in long and often occurring idle time periods, hence energy waste. The erratic behavior of the consumption profile can be mitigated by increasing operating pressure, that also results in energy waste. Therefore, using a high volume tank containing and storing compressed air can provide a solution which can overcome the above-mentioned problems.

Moreover, the stored potential energy of compressed gas can be utilized for generation of electrical power. The potential energy can, for example, be collected from natural energy sources which are effectively inexhaustible and are abundantly available throughout the world in various forms, such as wind, solar, tidal and wave energy. The energy obtained from natural energy sources can be stored in the form of potential energy of compressed gas, so as to be releasable during periods of power demand, as required. Accordingly, high pressure tanks are required for storing the compressed gas.

Various compressed air storage systems are generally known for the purpose of storing compressed gas. Gas storage tanks can, for example, be constructed on the ground surface, under the ground, and under water.

Gas storage tanks, which are built on the ground, have proven to be not economically viable when high volumes are required. Moreover, they require a high level of maintenance and must accommodate many safety regulations.

In urban areas, it is common to build underground compressed gas tanks in order to accomplish effective use of the ground surface in the regions where the underground construction is placed, and to preserve the site's appearance.

For example, U.S. Pat. Appl. Publ. No. 2010/307147 describes a system for storing energy that includes a buried flexible bladder. The bladder is covered with an overfill of earth, stones, or any other material. The weight of the overfill above the bladder pressurizes a fluid stored in the bladder. As the fluid fills the bladder, it expands and lifts the mass of the overfill against gravity. The system will store the energy required to lift the overfill. When desired, the fluid can be released from the bladder, and the gravitational pressure of the overfill above the bladder will force the fluid out of the bladder and into an exit pipe connected to the bladder. Upon release, the volume of the bladder is decreased.

U.S. Pat. Appl. Publ. No. 2013/119327 describes a compressed air storage system for storing compressed air provided by an air compressing system. The system includes an underground pressure tank having a cavity arranged in a borehole made in the ground, and an inflatable balloon arranged in the cavity configured for storing the compressed air. The inflatable balloon is surrounded by compacted filling material placed between the inflatable balloon and an inner surface of the borehole.

U.S. Pat. No. 5,052,856 describes a method for underground storage of a gas in which the stored gas or top gas is physically separated from the cushion gas to avoid undesired intermixing of the two gases. The gas separation can be accomplished by dividing an underground storage cavern into two portions using a flexible membrane attached at its periphery to the walls of the cavern, installing a plurality of balloons inflated with the cushion gas in the cavern or inflating a single large bladder in the cavern with the cushion gas. With additional separation of the cavern into multiple portions, a plurality of gases can be simultaneously stored in a single cavern.

SUMMARY

Despite the prior art in the area of underground systems for storing and utilization of compressed gas, there is still a need in the art for further improvement in order to provide a more economical and low-cost gas storage system and method for construction thereof.

It would also be advantageous to have an improved system and method which can effectively utilize available energy from wind turbines and other power generation systems, and store it for later use.

The present invention partially eliminates disadvantages of prior art systems for storing and utilization of compressed gas and provides a novel compressed gas storage system for storing compressed gas. The gas can, for example, be provided by a gas compressing system. The compressed gas storage system includes a borehole made in the ground. The borehole has a first borehole portion defined at the borehole top and a second borehole portion defined at the borehole bottom.

The first borehole portion has a first borehole portion depth and a first borehole portion width. The first borehole portion is filled with a filling or sealing material. The filling and sealing material can be concrete, flowable fill, dirt, or any type of cement mixture. The second borehole portion has a second borehole portion depth greater than the first borehole portion depth, and a second borehole portion width lower than said first borehole portion width.

The compressed gas storage system also includes a balloon arrangement. The balloon arrangement includes an inflatable balloon arranged within the second borehole portion and configured for storing the compressed gas. The inflatable balloon has a balloon port for providing access to an inner volume of the inflatable balloon. The balloon arrangement also includes an upper support member mounted onto the top of the inflatable balloon, and a lower support member arranged at the bottom of the inflatable balloon.

The upper support member has an upper support width equal to or greater than the second borehole portion width, and is configured for anchoring said inflatable balloon to said sealing material filling the first borehole portion and centering the top portion of the inflatable balloon at the top portion of the second borehole. The lower support member is configured for centering the inflatable balloon at the bottom of the second borehole portion.

The compressed gas storage system also includes a gas pipe assembly. The gas pipe assembly includes at least one inlet gas pipe configured for filling the inflatable balloon from said gas compressing system, and at least one outlet gas pipe coupled to the balloon port of the inflatable balloon, and configured for releasing the compressed gas.

The compressed gas storage system also includes a drainage pipe extending into a volume of the inflatable balloon to its bottom.

The compressed gas storage system further includes a compacted filling material placed within a gap formed between the inflatable balloon, the upper support member, the lower support member, and an inner surface of the second borehole portion. The compacted filling material fully surrounds the inflatable balloon, and is in a rigid and immobile state.

The compressed gas storage system also includes one or more filling material pipes extending along the borehole to the gap. The filling material pipes are configured for providing a filling material to the gap.

According to an embodiment of the present invention, the first borehole portion depth is in the range of about 1 meter to 20 meters and a first borehole portion width is in the range of about 1 meter to 10 meters.

In the present invention, the term "about" refers to a value, amount, or degree that is approximate or near the reference value. The term "about" means within a statistically meaningful range of a value and indicates a reasonable amount of deviation caused by the differences between various parameters characterizing the system that does not bring about a considerable change as a result. The extent of variation from the reference value encompassed by the term "about" is that which is typical for the tolerance levels or measurement conditions. The allowable variation encompassed by the term "about" depends on the particular system under consideration, and can be readily appreciated by one of ordinary skill in the art. This approximation for the purpose of the present invention can, for example, be interpreted so as to include an error of 10% at least, as long as there is no considerable change in the performance of the antenna due to the deviation.

According to an embodiment, the second borehole portion depth is in the range of about 5 to 100 meters and a second borehole portion width is in the range of about 1 meter to 5 meters.

According to an embodiment of the present invention, the sealing material fills up the entire volume between the upper support member and the ground level.

According to an embodiment of the present invention, the sealing material includes a layer of a cement based material injected onto the top of the upper support member. The layer of the cement based material can, for example, be in the form of a slab mounted at the bottom of the first borehole portion onto the top of the upper support member.

According to one embodiment of the present invention, the inlet gas pipe is arranged within a lumen of the outlet gas pipe. According to another embodiment of the present invention, the outlet gas pipe is arranged within a lumen of the inlet gas pipe.

The compressed gas storage system of the present invention has many of the advantages of the prior art techniques, while simultaneously overcoming some of the disadvantages normally associated therewith.

The compressed gas storage system according to the present invention may be easily and efficiently fabricated and marketed.

The compressed gas storage system according to the present invention is of durable and reliable construction.

The compressed gas storage system according to the present invention may have a relatively low manufacturing cost.

According to another general aspect of the present invention, there is provided a method for constructing a compressed gas storage system for storing compressed gas. The method includes creating a borehole in the ground. The borehole has a first borehole portion defined at a borehole top and a second borehole portion defined at a borehole bottom.

The first borehole portion has a first borehole portion depth and a first borehole portion width. The first borehole portion is filled with a sealing material. The second borehole portion has a second borehole portion depth greater than said first borehole portion depth, and a second borehole portion width lower than said first borehole portion width.

According to one embodiment of the present invention, the first borehole portion and the second borehole portion have hollow cylindrical shapes. A transverse cross-section of the first borehole portion and the second borehole portion has a shape selected from circular, oval, and polygonal.

According to another embodiment of the present invention, at least one of the portions selected from the first borehole portion and the second borehole portion has a truncated cone shape arranged upside down with lower cone bases arranged at the corresponding bottoms of the first and the second borehole portions.

According to a further embodiment of the present invention, the first borehole portion includes two or more cylindrical sub-portions, each sub-portion having different width and depth.

According to still a further embodiment of the present invention, the second borehole portion is in the form of an ellipsoidal cavity formed in the ground.

The method of the present invention also includes providing a balloon arrangement including an inflatable balloon in a collapsed state, and arranging said inflatable balloon within the second borehole portion.

According to an embodiment of the present invention, the arranging of the inflatable balloon within the second borehole portion includes pulling the inflatable balloon down and centering of the inflatable balloon at a bottom of the second borehole portion.

The inflatable balloon has a balloon port for providing access to an inner volume of the inflatable balloon. The balloon arrangement includes an upper support member mounted on top of said inflatable balloon, and a lower support member arranged at the bottom of the inflatable balloon.

According to an embodiment of the present invention, a width of said upper support member is greater than the width of the second borehole portion.

The method of the present invention also includes providing a gas pipe assembly comprising at least one inlet gas pipe and at least one outlet gas pipe, and coupling the gas pipe assembly to the balloon port of the inflatable balloon.

The method of the present invention also includes providing a drainage pipe extending into the volume of the inflatable balloon to its bottom. The drainage pipe is configured for extracting water from the inflatable balloon.

The method of the present invention also includes providing at least one filling material pipe extending along the borehole to a gap defined between the inflatable balloon, the upper support member, the lower support member, and an inner surface of the second borehole portion.

Then, the borehole in the ground is sealed with a sealing material by injecting the sealing material on top of the upper support member to fill up the entire volume between the upper support member and the ground level, thereby anchoring the inflatable balloon to the sealing material placed within the first borehole portion.

The method of the present invention further includes curing the sealing material as long as required to obtain a predetermined compressive strength, tensile strength and friction force between the sealing material and the borehole. The predetermined compressive strength can, for example, be in the range of about 10 mPa to 200 mPa. The compressive and tensile strength depend on the operational storage pressure of the gas, the curing time and the friction force between the cured sealing material and inner surface of the borehole.

The method of the present invention further includes filling the inflatable balloon with water and then providing a filling material into the gap between the inflatable balloon, the upper support member, the lower support member, and the inner surface of the second borehole portion. The filling material is injected in the amount as much as required to fully surround the inflatable balloon with the filling material which, after solidification, becomes in a rigid and immobile state.

According to an embodiment of the present invention, the providing of the filling material is carried out by injecting, at high pressure, the filling material, thereby to compact and consolidate the filling material around the inflatable balloon. The filling material can, for example, include grout, flowable fill or any type of cement based material. The filling material could also include different type polyurethane Once the filling material gets solidified water is released from the inflatable balloon through the drainage pipe by introducing pressurized gas introduced in the balloon. Finally, the balloon can be filled with compressed gas.

It should be understood that the system of the present invention is not limited to a gas storage application, but can also be used for storing any type of fluid at low and/or high pressure.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

The principles and operation of the underground compressed gas storage system according to the present invention may be better understood with reference to the drawings and the accompanying description. It should be understood that these drawings are given for illustrative purposes only and are not meant to be limiting. It should be noted that the figures illustrating various examples of the system of the present invention are not to scale, and are not in proportion, for purposes of clarity. It should be noted that the blocks as well other elements in these figures are intended as functional entities only, such that the functional relationships between the entities are shown, rather than any physical connections and/or physical relationships. The same reference numerals and alphabetic characters are utilized for identifying those components which are common in the hydro-pneumatic energy storage system and its components shown in the drawings throughout the present description of the invention. Examples of constructions are provided for selected elements. Those versed in the art should appreciate that many of the examples provided have suitable alternatives which may be utilized.

Figure 1:
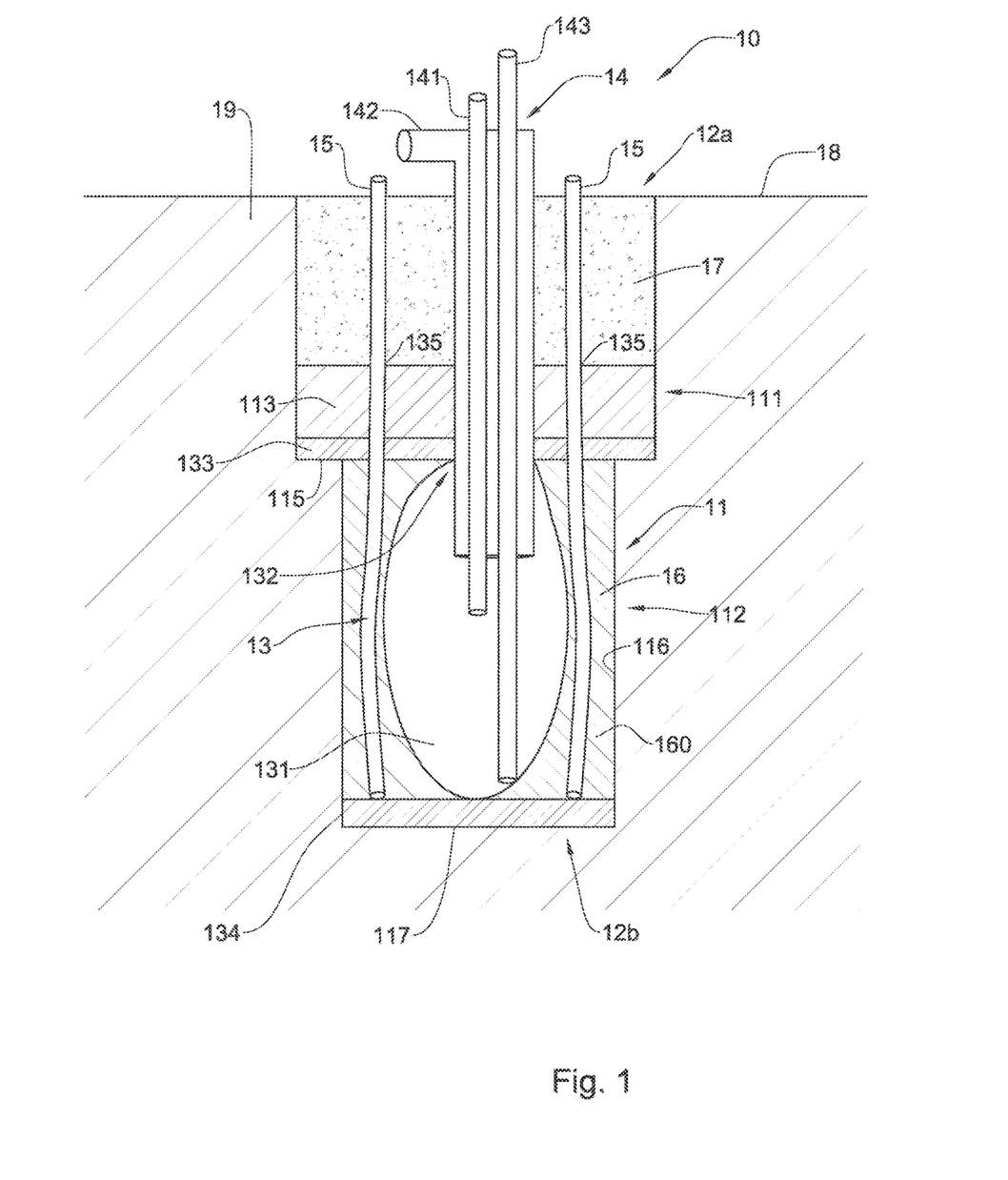
FIG. 1 is a schematic cross-sectional view of a compressed gas storage system, according to an embodiment of the present invention.

Referring to FIG. 1, a schematic cross-sectional view of a compressed gas storage system 10 is illustrated, according to an embodiment of the present invention. The compressed gas storage system 10 includes a borehole 11 made in the ground. According to one embodiment of the present invention, the borehole 11 includes a first borehole portion 111 defined at borehole top 12a and a second borehole portion 112 defined at a borehole bottom 12b. The first borehole portion 111 has a first borehole portion depth and a first borehole portion width. The second borehole portion 112 has a second borehole portion depth and a second borehole portion width. According to this embodiment, the second borehole portion depth is greater than the first borehole portion depth, and a second borehole portion width lower than the first borehole portion width. As will be described herein below, this provision enables to increase the friction of the construction with the soil surrounding the borehole portion 111.

The compressed gas storage system 10 also includes a balloon arrangement 13. The balloon arrangement 13 includes an inflatable balloon 131 arranged within the second borehole portion 112, and configured for storing compressed gas. The term "balloon" is broadly used to describe any inflatable container, chamber or vessel that can be used for holding compressed fluid (gas or liquid) at a desired pressure.

The inflatable balloon 131 can, for example, be made of a deformable, durable, strong plastic material, rubber material or any type of polymer based material having a braid or other reinforcement that can sustain large deformation. The large deformation can, for example, be in the range of about 10% to 500% volume change. It is also required that the balloon's material can resist underground chemical reactions (e.g., soil deposits) and moisture (e.g., rain) infiltration.

The inflatable balloon 131 has a balloon port 132 for providing access to an inner volume of the inflatable balloon. The balloon port 132 can be arranged at any suitable place of the inflatable balloon 131, for example, at the top of the inflatable balloon, and can be configured for ingress and egress of a pressurized gas.

The balloon arrangement 13 also includes an upper support member 133 mounted on top of the inflatable balloon 131. The upper support member 133 can, for example, be a metal plate capable of withstanding the weight of material placed on upper support member 133 during construction of the storage system.

Thickness of the support member 133 is selected to withstand the weight of the sealing material 17 such that it would not plastically deform. The upper support member 133 can, for example, have thickness in the range of about 1 millimeter to 50 millimeters, a width in the range of 1 to 5 meters and a weight in the range of about 5 kg to 5000 kg. The first borehole portion 111 is filled with a sealing material 17 filling the entire volume between the upper support member 133 and a ground level 18. For example, the sealing material can be a concrete material in a rigid and immobile state. The upper support member 133 is arranged on a bottom 115 of the first borehole portion 111, and configured for supporting the sealing material 17 that fills up the entire volume of the first borehole portion 111.

To increase the friction of the upper support member 133 with the sealing material 17 and a soil 19 surrounding the upper support member 133, a width of the upper support member 133 can be greater than the width of the second borehole portion 112. Thus, the upper support member 133 anchors the inflatable balloon 131 to the sealing material 17 filling the first borehole portion 111 and to the soil surrounding the first borehole portion 111.

According to an embodiment of the present invention, the sealing material 17 filling the first borehole portion 111 includes a layer 113 of a concrete material formed as a slab at the bottom of the first portion 111 on the top of the upper support member 133. The layer 113 has greater strength than the strength of the remaining sealing material 17. To increase the friction between the sealing material 17 and the soil 19, the width of the concrete layer 113 can be equal to or larger than the width of the bottom 115 of the first borehole portion 111.

The balloon arrangement 13 also includes a lower support member 134 arranged at a lower part of the inflatable balloon 131. The lower support member 134 is configured for centering the inflatable balloon 131 at a bottom 117 of said second borehole portion 112 and pulling the balloon 131 down during its mounting within the second borehole portion.

The compressed gas storage system 10 further includes a gas pipe assembly 14 including at least one inlet gas pipe 141 and at least one outlet gas pipe 142 passing through the upper support member 133 having a through hole 136 for this purpose, and hydraulically coupled to an inner volume of the inflatable balloon 131 through the balloon port 132. The inlet gas pipe 141 is configured for filling the inflatable balloon 131 from a gas compressing system (not shown). The outlet gas pipe 142 is configured for releasing the compressed gas for utilization.

According to the embodiment shown in FIG. 1, the inlet gas pipe 141 is arranged through the outlet gas pipe 142 within the lumen of the outlet gas pipe 142 and extends into the volume of the inflatable balloon 131. However, when desired, the outlet gas pipe 142 can be arranged within the lumen of the inlet gas pipe 141. This provision enables separation of an ingress gas flow filling the system from an egress gas flow when these flows pass simultaneously during filling with and releasing the compressed gas, thereby preventing mixing of the ingress and the egress gas flows in the inflatable balloon 131 during operation.

The pipe arrangement including flow separation can promote water extraction from the egress gas flow. Specifically, when an atmospheric air having a great humidity is used as a gas for storing in the storage system of the present invention water droplets carrying by the egress gas flow can be accumulated at the balloon 131. Thus, the ingress flow released from the system and having a relative humidity lower than the relative humidity of the egress gas flow will not be mixed with the egress gas flow.

According to an embodiment of the present invention, the compressed gas storage system 10 further includes a drainage pipe 143 extending into the volume of the inflatable balloon 131 to its bottom. The purpose of the drainage pipe 143 is to pump out the water that can be condensed from the gas as a result of condensation during operation. As shown in FIG. 1, the drainage pipe 143 can be arranged within the lumen of the outlet gas pipe 142, however other configurations are also contemplated. For example, the drainage pipe 143 can be arranged within the inlet gas pipe 141, or may be separated from the gas pipe assembly 14.

The compressed gas storage system 10 further includes one or more filling material pipes 15 extending to the bottom 117 of said second borehole portion 112 along the borehole 11 to a gap 16 formed between the inflatable balloon 131, the upper support member 133, the lower support member 134, and an inner surface 116 of the second borehole portion 112. The filling material pipes 15 can, for example, be fixed to the lower support member 134. The filling material pipes 15 pass through the upper support member 133 having through holes 135. The filling material pipes 15 are configured for providing a filling material 160 into the gap 16 to fill it with the filling material that becomes compacted during construction of the compressed gas storage system 10, as will be described herein below in detail. The compacted filling material 160 fully surrounds the inflatable balloon 131, and is in a rigid and immobile state.

A method of constructing the compressed gas storage system 10 is illustrated in FIGS. 2A-6, according to an embodiment of the present invention.

Figure 2A:
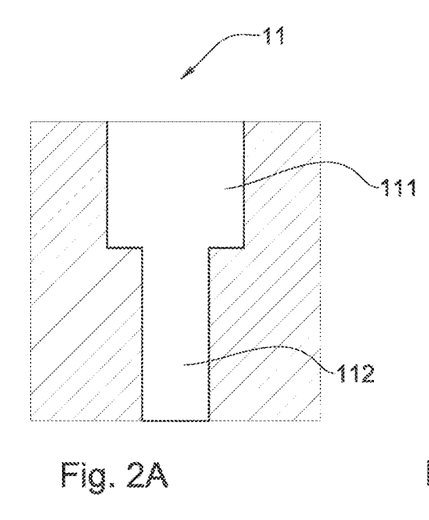
FIGS. 2A-2C illustrate a longitudinal top cross-sectional view of several examples of the borehole drilled for the compressed gas storage system, according to the present invention.

In order to construct the compressed gas storage system 10, the borehole 11 is drilled in the ground to a predetermined depth. As described above, the borehole 11 includes a first borehole portion 111 defined at borehole top 12*a* and a second borehole portion 112 defined at borehole bottom 12*b*. FIG. 2A illustrates an example of a longitudinal top cross-sectional view of the borehole 11. Although the first borehole portion 111 and the second borehole portion 112 shown in FIG. 2A have hollow cylindrical shapes, other shapes are also contemplated. It should also be understood that a transverse cross-section of the first borehole portion 111 and the second borehole portion 112 can, for example, be circular, oval, polygonal, or have any other desired shape.

Figure 2B:
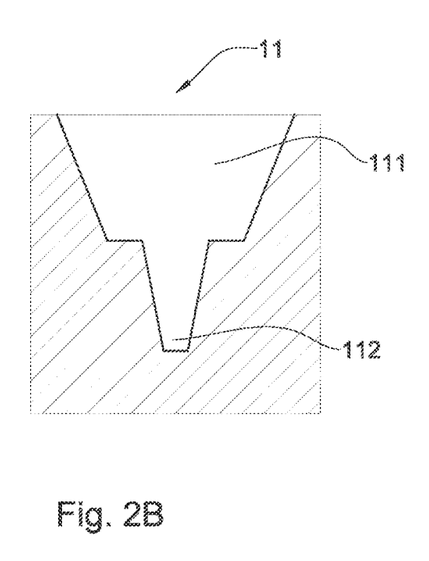

FIG. 2B illustrates a schematic longitudinal top cross-sectional view of the borehole 11, according to another example. In this case, the first borehole portion 111 and the second borehole portion 112 have a truncated cone shape (conical frustum) arranged upside down with lower bases arranged at the corresponding bottoms. According to another example (not shown), only one portion, either the first borehole portion 111 or the second borehole portion 112, can have a truncated cone shape.

Figure 2C:
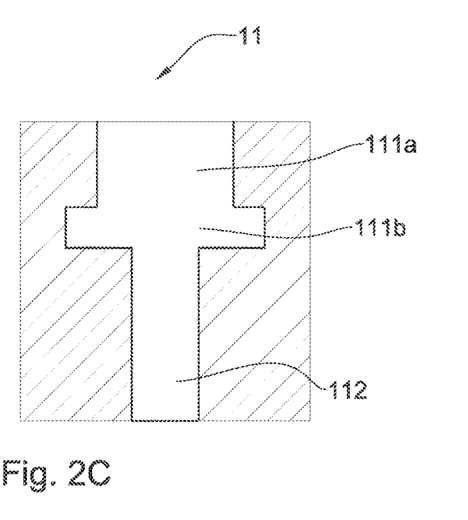

According to a further example, as shown in FIG. 2C, the first borehole portion 111 may include two or more cylindrical sub-portions 111*a* and 111*b*, each having different width and depth.

Figure 2D:
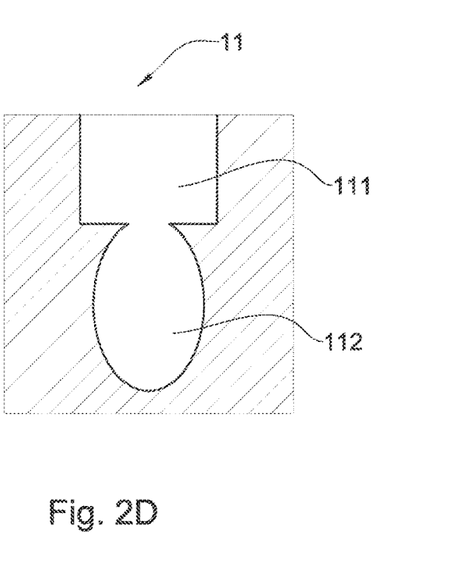

According to a further example, as shown in FIG. 2D, the second borehole portion 112 may be in the form of an ellipsoidal cavity formed in the ground; however, other shapes for the cavity are also contemplated.

The entire depth of the borehole 11 and the relationship between the depth of the first and second borehole portions 111 and 112 are mainly determined by the soil properties and by the maximal value of the desired magnitude of the pressure of the compressed gas that is stored within the inflatable balloon 131. The width of the first and second borehole portions 111 and 112 are mainly defined by the desired dimensions of the compressed gas storage system 10 and by the magnitude of the pressure of the compressed gas. For example, in order to increase friction forces exerted by the sealing material 17, the first borehole can either be constructed to have a higher depth or a higher width.

Further steps of construction of the compressed gas storage system of the present invention will be described for the embodiment shown in FIG. 2A. According to this embodiment, the second borehole portion depth can be either greater or smaller than the first borehole portion depth. However, the second borehole portion width can be lower than or equal to the first borehole portion width. The depth of the borehole is such that the inflatable balloon (131 in FIG. 1) is located relatively deep inside the ground in order to be anchored, due to the resistance of the sealing material filling the first borehole portion 111 and the resistance of the filling material surrounding the inflatable balloon. This configuration enables prevention of variations of the volume of the inflatable balloon 131 after installation of the compressed gas storage system 10, and thereby avoids lifting up and down the sealing material 17 and the soil 19 located above the balloon during filling the balloon 131 with a gas and releasing the gas for utilization.

For example, the first borehole portion depth can be in the range of about 1 to 20 meters and a first borehole portion width is in the range of about 1 to 10 meters, while the second borehole portion depth can be in the range of about 5 to 100 meters and a second borehole portion width is in the range of about 1 to 5 meters.

Figure 3:
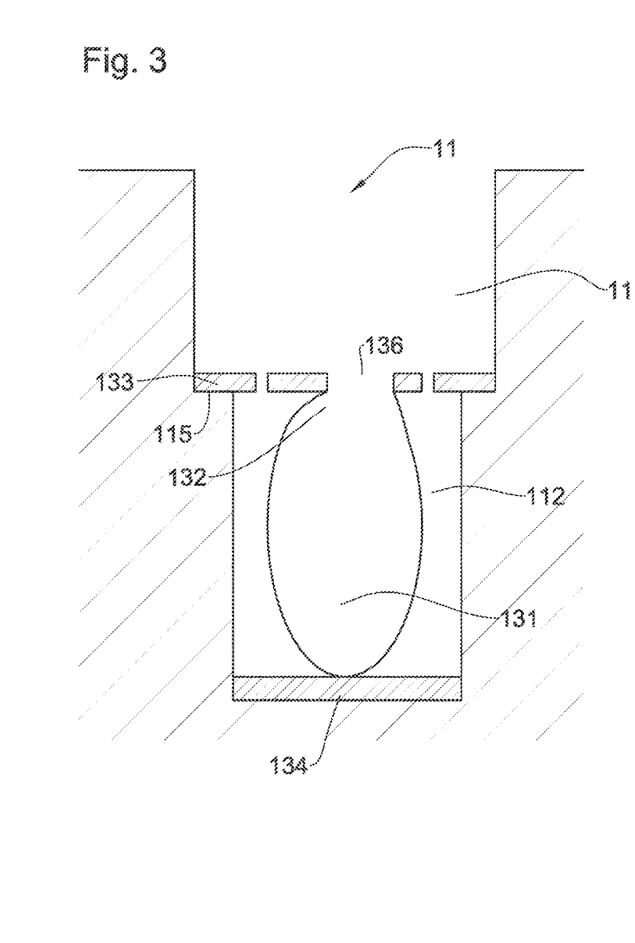
FIGS. 3-6 illustrate method steps of constructing the compressed gas storage system, according to an embodiment of present invention.

Once the borehole 11 is drilled, an inflatable balloon 131 in a collapsed state is placed at the second borehole portion 112, as shown in FIG. 3. The lower support member 134 is used for pulling the balloon 131 down and for centering the inflatable balloon within the second borehole portion 112. The upper support member 133 is arranged above the second borehole portion 112 at the bottom 115 of the first borehole portion 111.

Figure 4:
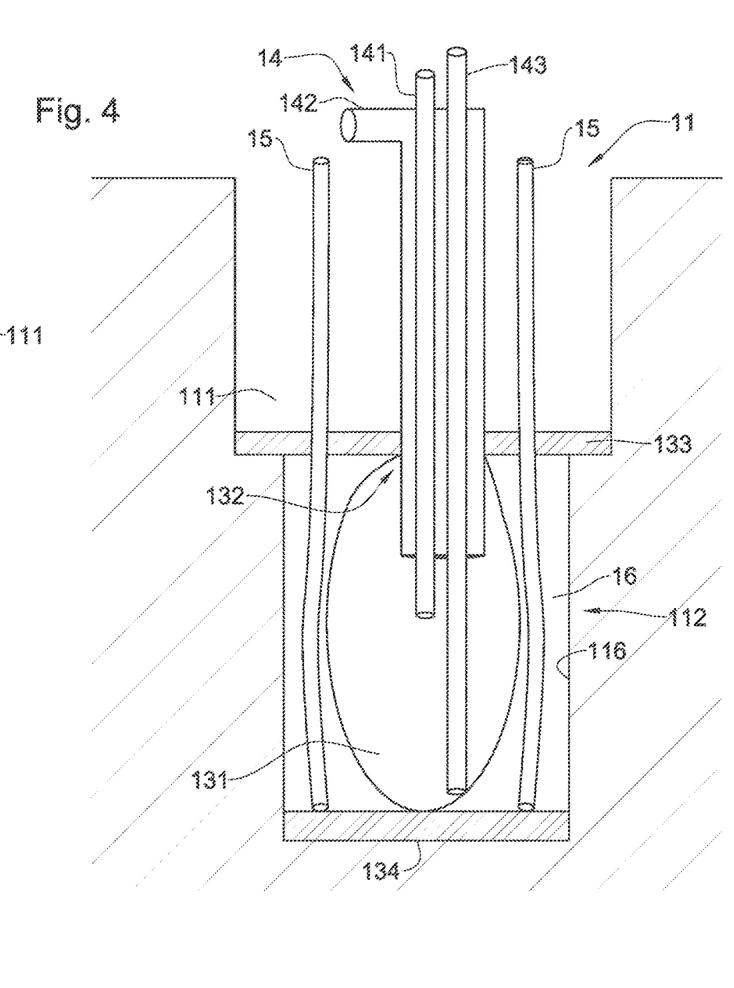

As shown in FIG. 4, the method of construction of the compressed gas storage system 10 further includes providing a gas pipe assembly 14 including the inlet gas pipe 141 and the outlet gas pipe 142, one more filling material pipe 15 extending along the borehole to the gap 16 defined between the inflatable balloon 131, the drainage pipe 143, for example, within the lumen of the outlet gas pipe 142, the upper support member 133, the lower support member 134, and the inner surface 116 of the second borehole portion 112. The filling material pipes 15 are fixed to the lower support member 134 for injection of the filling material in the bottom portion of the second borehole 112.

The inlet gas pipe 141 and the outlet gas pipe 142 at one end are hydraulically coupled to an inner volume of the inflatable balloon 131 through the balloon port 132. At the other end, the inlet gas pipe 141 is configured for coupling to a gas compressing system (not shown), while the outlet gas pipe 142 is configured for releasing the compressed gas for utilization.

According to an embodiment, the method of construction of the compressed gas storage system 10 further includes providing the drainage pipe 143 extending into the volume of the inflatable balloon 131 to its bottom. As shown in FIG. 4, the drainage pipe 143 is arranged within the lumen of the outlet gas pipe 142, however other configurations are also contemplated.

Figure 5:
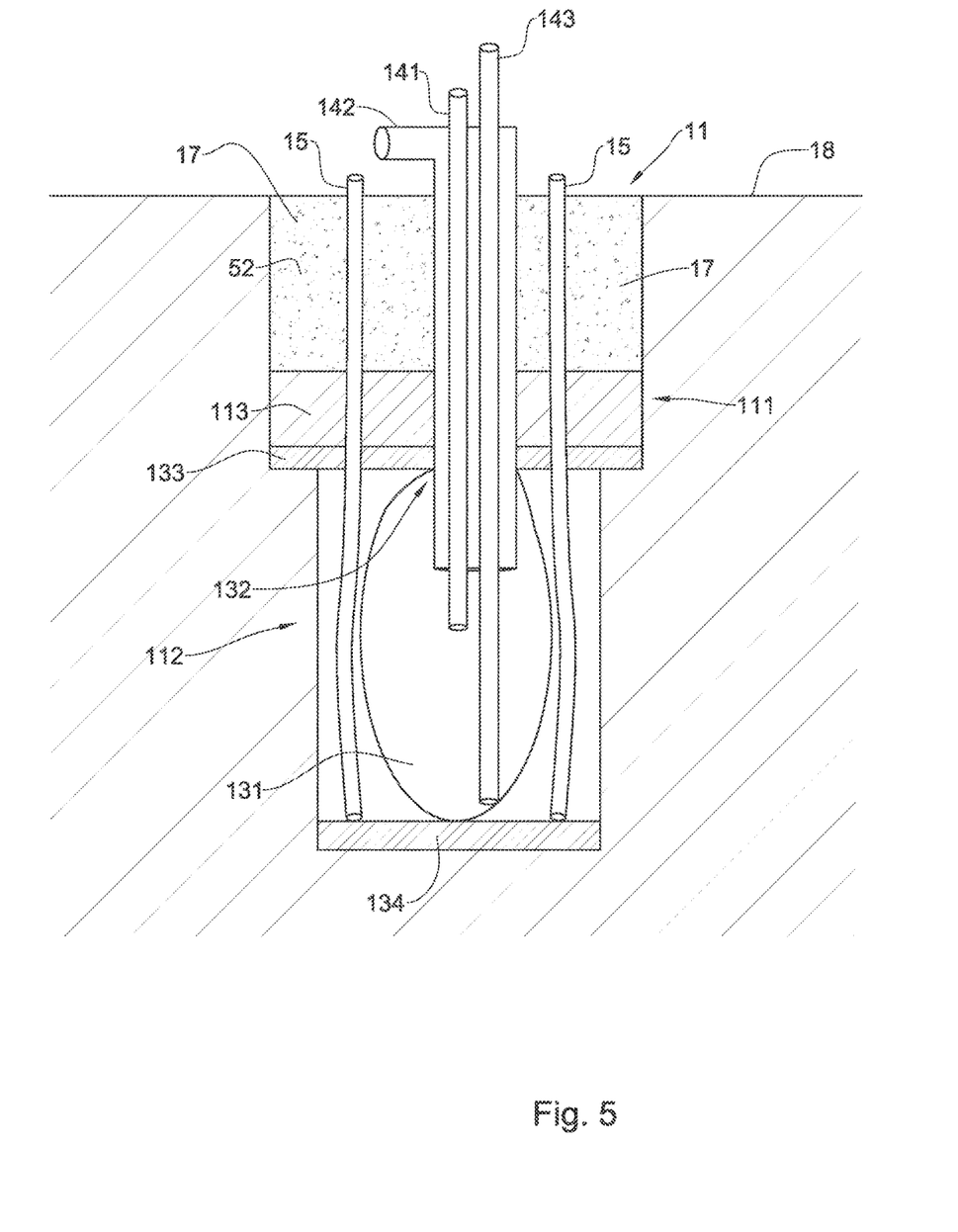

Further, as shown in FIG. 5, the borehole 11 in the ground is sealed with the sealing material 17 injected onto the top of the upper support member 133. The sealing material 17 fills up the entire volume of the first borehole portion 111 between the upper support member 133 and the ground level 18, thereby anchoring said inflatable balloon to the sealing material.

According to an embodiment, the sealing material can include the layer 113 of concrete material injected onto the top of the upper support member 133. After curing, the concrete layer 113 forms a slab arranged onto the top of the upper support member 133. The curing of the concrete layer 113 is carried out as long as required to obtain the slab having a desired compressive and tensile strength to support the weight of the filling material 17. The compressive strength of the concrete layer 113 can, for example, be in the range of about 10 mPa to 200 mPa.

The height of the concrete layer 113 can, for example, be in the range of 1 meter to 20 meters. The concrete layer 113 can occupy the entire volume of the first borehole portion 111 between the upper support member 133 and the ground level 18 or just a part of this volume. In the latter case, after the curing of the concrete layer 113, a remaining volume 52 of the first borehole portion 111 between the concrete layer 113 and the ground level 18 is covered with another sealing material, which can, for example, be a controlled low strength material (CLSM) and/or the soil that was excavated during drilling the borehole 11.

Figure 6:
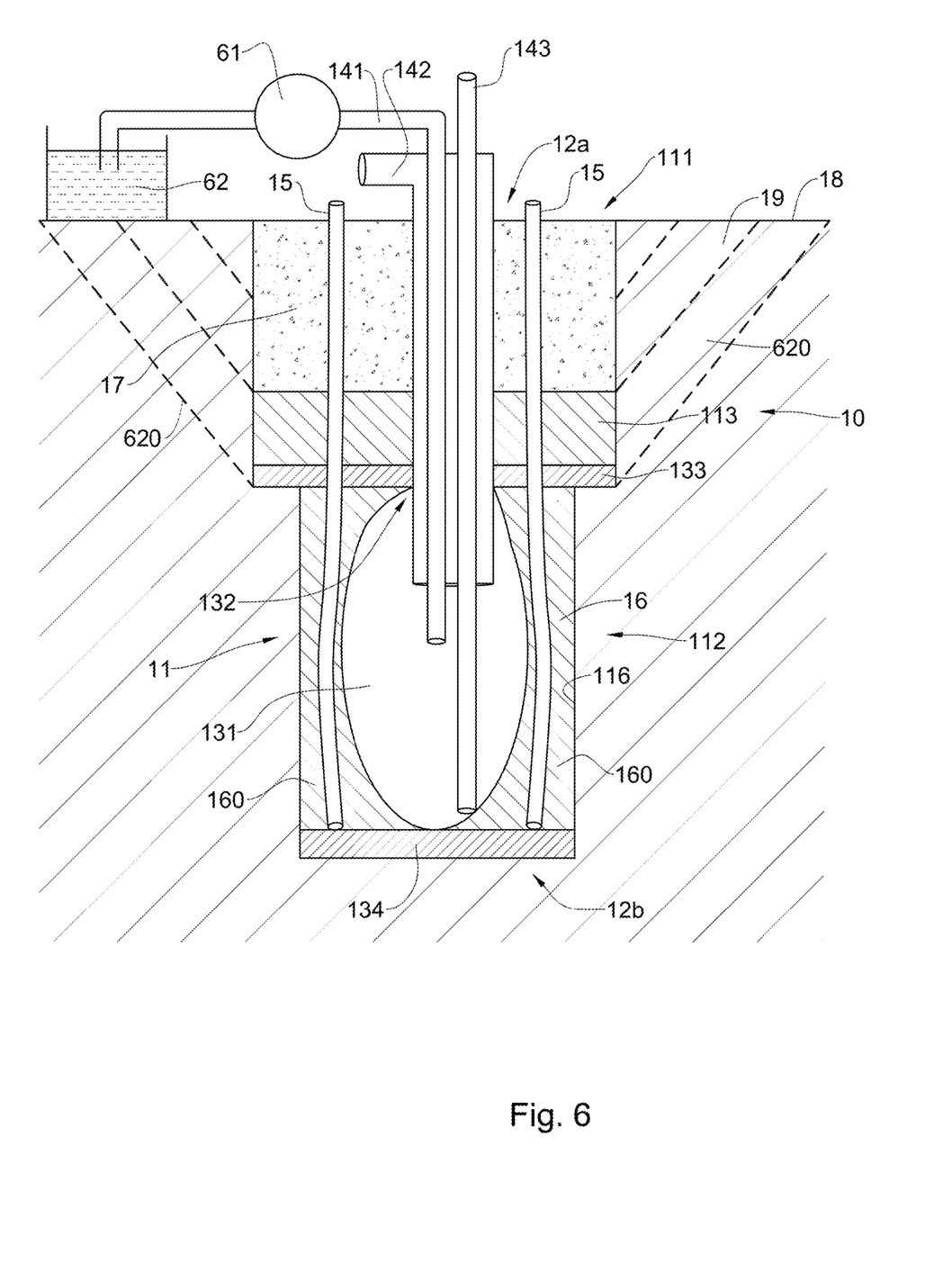

Referring to FIG. 6, the inflatable balloon 131 is then connected to a water pump 61 via the gas pipe assembly 14 (e.g., via the inlet gas pipe 141), and filled up with water. The water pump 61 is coupled to a water tank 62, and is configured to transmit water from the water tank 62 to the inflatable balloon 131.

Then, a filling material is provided into the gap 16 between the inflatable balloon 131, the upper support member 133, the lower support member 134, and the inner surface 116 of the second borehole portion 112 via the filling material pipes 15, thereby to fully surround the inflatable balloon 131 with the filling material (indicated by the reference numeral 160). An example of a filling material suitable for the purpose of the invention includes, but is not limited to, a cement based filling material (e.g., grout), polyurethane, concrete, etc.

The filling material is injected into the gap 16 at high pressure. As a result, the pressure of the injected filling material is counterbalanced by the pressure of the inflatable balloon 131, thereby causing compaction and consolidation of the filling material 160 in the second borehole portion 112 as well as compaction and consolidation of the soil 19 surrounding the borehole 11 along soil shear planes 620 extending along a cone tapered outwardly with expansion from the upper support member 133 towards the ground level 18.

In order to prevent lifting up the upper support member 133 and failure of the sealed material in the first borehole portion 111, the pressure of the injected filling material is controlled so as to not exceed the pressure threshold. The concrete layer 113 (slab) 113 arranged onto the top of the upper support member 133 provides resistance for the upper support member 133 to lift up.

The pressure threshold can, for example be calculated on the basis of Mohr-Coulomb failure criterion $\tau = c + \sigma \tan \phi$, expressing a relationship between the soil shear strength $\tau$ and normal stress σ on the failure plane, where c is the cohesion of the material and ϕ is the friction shear angle. The normal stress σ depends on the pressure of the injected grout as well on the soil mechanical properties.

Generally, the soil constitutive model considers the filling material as an elastic-plastic material. The maximum magnitudes of the stress and strain (threshold) which the filling material and the surrounding soil 19 can sustain can be calculated from the Mohr-Coulomb failure criterion. Once passing this threshold, the sealing material will be displaced, rather than compacted.

It was evaluated by the inventors, that in order to obtain the best results for compaction, the pressure of the injected filling material can, for example, be in the range of about 10 bar to 500 bar. After drying, the filling material around the inflatable balloon consolidates, and the balloon 131 cannot further change its volume during exploitation of the compressed gas storage system 10, since the filling material remains in a rigid and immobile state.

Finally, the water is pumped out from the balloon 131 through drainage pipe 143 by introducing pressurized gas through the inlet gas pipe 141. Once all water is pumped out from the balloon 131, the compressed gas storage system 10 can be used for storage of compressed gas.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It should be understood that the compressed gas storage system of the present invention is not limited to storage of compressed gas. It can be successfully employed for storing any other fluid as well, including a mixture of gases and/or liquids.

Although construction of the compressed gas storage system of the present invention was described for the borehole shown in FIG. 2A, the compressed gas storage system can also be configured for the boreholes shown in FIGS. 2B-2D, mutatis mutandis.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A compressed gas storage system for storing compressed gas provided by a gas compressing system, comprising:
   a borehole made in a ground, comprising:
      at least a first borehole portion defined at a borehole top and having a first borehole portion depth and a first borehole portion width, said first borehole portion being filled with a sealing material; and
      a second borehole portion defined at a borehole bottom and having a second borehole portion depth greater than said first borehole portion depth, and a second borehole portion width is less than said first borehole portion width;
   a balloon arrangement comprising:
      an inflatable balloon arranged within the second borehole portion and configured for storing the compressed gas, said inflatable balloon having a balloon port for providing access to an inner volume of the inflatable balloon;
      an upper support member mounted on top of said inflatable balloon, said upper support member having an upper support width greater than said second borehole portion width, and configured for anchoring said inflatable balloon to said first borehole portion; and
      a lower support member arranged at a lower part of the inflatable balloon, and configured for centering said inflatable balloon at the bottom of said second borehole portion;
   a gas pipe assembly comprising:
      at least one inlet gas pipe configured for filling the inflatable balloon from said gas compressing system; and
      at least one outlet gas pipe coupled to the balloon port of the inflatable balloon, and configured for releasing the compressed gas;
   a drainage pipe extending into the inner volume of the inflatable balloon to a bottom of the inflatable balloon;
   a compacted filling material placed within a gap formed between the inflatable balloon, said upper support member, said lower support member, and an inner surface of the second borehole portion; said compacted filling material fully surrounding the inflatable balloon, and being in a rigid and immobile state; and
   at least one filling material pipe extending along the borehole to said gap, and configured for providing a filling material thereto.

2. The system of claim 1, wherein said first borehole portion depth is in the range of 1 meter to 20 meters and a first borehole portion width is in the range of 1 m to 10 m.

3. The system of claim 1, wherein said second borehole portion depth is in the range of about 5 meters to 100 meters and a second borehole portion width is in the range of about 1 meter to 5 meters.

4. The system of claim 1, wherein the first borehole portion and the second borehole portion have hollow cylindrical shapes.

5. The system of claim 4, wherein a transverse cross-section of the first borehole portion and the second borehole portion has a shape selected from circular, oval, and polygonal.

6. The system of claim 1, wherein at least one of the portions selected from the first borehole portion and the second borehole portion has a truncated cone shape arranged upside down with lower cone bases arranged at the corresponding bottoms of the first and the second borehole portions.

7. The system of claim 1, wherein the first borehole portion includes two or more cylindrical sub-portions, each sub-portion having different width and depth.

8. The system of claim 1, wherein the second borehole portion is in the form of an ellipsoidal cavity formed in the ground.

9. The system of claim 1, wherein said sealing material fills up the entire volume between the upper support member and a ground level.

10. The system of claim 1, wherein said sealing material includes a layer of a concrete material injected onto a top of said upper support member.

11. The system of claim 10, wherein the layer of the concrete material is in the form of a slab mounted at the bottom of the first borehole portion on the top of the upper support member.

12. The system of claim 1, wherein the inlet gas pipe is arranged within a lumen of the outlet gas pipe.

13. The system of claim 1, wherein the outlet gas pipe is arranged within a lumen of the inlet gas pipe.

14. A method for constructing a compressed gas storage system for storing compressed gas provided by a gas compressing system, the method comprising:
   creating a borehole in ground, comprising at least a first borehole portion defined at a borehole top and having a first borehole portion depth and a first borehole portion width, and a second borehole portion defined at a borehole bottom and having a second borehole portion depth greater than said first borehole portion depth and a second borehole portion width lower than said first borehole portion width;
   providing a balloon arrangement comprising:
      an inflatable balloon in a collapsed state, said inflatable balloon having a balloon port for providing access to an inner volume of the inflatable balloon;
      an upper support member mounted on a top of said inflatable balloon, said upper support member having an upper support width greater than said second borehole portion width; and
      a lower support member arranged at a lower part of the inflatable balloon; arranging said inflatable balloon within the second borehole portion;
   providing a gas pipe assembly comprising at least one inlet gas pipe and at least one outlet gas pipe, and coupling said gas pipe assembly to the balloon port of the inflatable balloon;
   providing a drainage pipe extending into the inner volume of the inflatable balloon to a bottom of the inflatable balloon, and configured for extracting water from the inflatable balloon;
   providing at least one filling material pipe extending along the borehole to a gap defined between the inflatable balloon, said upper support member, said lower support member, and an inner surface of the second borehole portion;
   sealing said borehole in the ground with a sealing material by injecting said sealing material on a top of the upper support member to fill up an entire volume in the borehole between the upper support member and ground level, thereby anchoring said inflatable balloon to said sealing material;
   curing said sealing material as long as required to obtain a predetermined compressive strength;
   filling said inflatable balloon with water;
   providing a filling material into the gap between the inflatable balloon, said upper support member, said lower support member, and the inner surface of the second borehole portion, thereby to fully surround the inflatable balloon with filling material in a rigid and immobile state, wherein said providing of the filling material is carried out by injecting, at high pressure, the filling material, thereby to compact and consolidate the filling material around the inflatable balloon;
   releasing the water from the inflatable balloon through the drainage pipe; and
   filling the inflatable balloon with said compressed gas.

15. The method of claim 14, wherein said arranging of said inflatable balloon within the second borehole portion includes pulling said inflatable balloon down and centering said inflatable balloon at the bottom of said second borehole portion.

16. The method of claim 14, wherein said predetermined compressive strength is in the range of about 10 mPa to 200 mPa.

17. The method of claim 14, wherein said filling material includes grout.

* * * * *